United States Patent
Millward et al.

(10) Patent No.: US 11,053,838 B2
(45) Date of Patent: Jul. 6, 2021

(54) COMBUSTION CHAMBER GEOMETRY

(71) Applicant: WESTPORT FUEL SYSTEMS CANADA INC., Vancouver (CA)

(72) Inventors: Philip C. Millward, Ann Arbor, MI (US); William D. Tenny, Novi, MI (US)

(73) Assignee: WESTPORT FUEL SYSTEMS CANADA INC., Vancouver (CA)

( * ) Notice: Subject to any disclaimer, the term of this patent is extended or adjusted under 35 U.S.C. 154(b) by 0 days.

(21) Appl. No.: 15/525,002

(22) PCT Filed: Nov. 6, 2015

(86) PCT No.: PCT/CA2015/051156
§ 371 (c)(1),
(2) Date: May 5, 2017

(87) PCT Pub. No.: WO2016/070291
PCT Pub. Date: May 12, 2016

(65) Prior Publication Data
US 2018/0245506 A1     Aug. 30, 2018

Related U.S. Application Data

(60) Provisional application No. 62/076,423, filed on Nov. 6, 2014.

(51) Int. Cl.
*F02B 23/08*     (2006.01)
*F02F 3/26*      (2006.01)
(Continued)

(52) U.S. Cl.
CPC .............. *F02B 23/08* (2013.01); *F02B 31/00* (2013.01); *F02B 43/00* (2013.01); *F02B 69/04* (2013.01);
(Continued)

(58) Field of Classification Search
CPC ...... F02D 19/10; F02D 19/1076; F02D 23/08; F02D 31/00; F02D 43/00; F02D 69/04; F02D 75/38; F02F 1/24; F02F 3/26
(Continued)

(56) References Cited

U.S. PATENT DOCUMENTS 5,699,766 A * 12/1997 Saito ..................... F02B 23/101
                                                              123/257
5,738,076 A *  4/1998 Kim ......................... F02B 23/08
                                                              123/527

(Continued)

FOREIGN PATENT DOCUMENTS

| CN | 101109311 A | 1/2008 |
| FR | 2834002 A1  | 6/2003 |
| JP | 3758364 B   | 3/2006 |

OTHER PUBLICATIONS

International Search Report and Written Opinion of the International Searching Authority, dated Feb. 5, 2016.

*Primary Examiner* — John Kwon
*Assistant Examiner* — Johnny H Hoang
(74) *Attorney, Agent, or Firm* — Carie C. Mager

(57) ABSTRACT

Diesel engines modified to be fueled with gaseous fuels experience problems with knocking and pre-ignition, limiting the compression ratio and efficiency of the engine. A new combustion chamber for a gaseous fueled internal combustion engine, in which the combustion chamber is defined by a cylinder head, a bore in a cylinder block and a piston reciprocating in the bore, comprises a piston portion of the combustion chamber defined by a recessed shape in a piston crown; and a head portion of the combustion chamber defined by a recessed surface in the cylinder head. A ratio between the piston portion of combustion chamber volume and the head portion of combustion chamber volume is in a range of 0.7 to 1.3.

22 Claims, 3 Drawing Sheets

(51) Int. Cl.
*F02B 43/00* (2006.01)
*F02B 69/04* (2006.01)
*F02B 31/00* (2006.01)
*F02F 1/24* (2006.01)

(52) U.S. Cl.
CPC ............... *F02F 1/24* (2013.01); *F02F 3/26* (2013.01); *F02F 2001/241* (2013.01); *Y02T 10/12* (2013.01); *Y02T 10/30* (2013.01)

(58) Field of Classification Search
USPC ........ 123/264–270, 274, 279–281, 285, 306, 123/307, 657, 664, 671
See application file for complete search history.

(56) References Cited

U.S. PATENT DOCUMENTS

| | | | | |
|---|---|---|---|---|
| 5,806,482 A * | 9/1998 | Igarashi | ............... | F02B 17/005 123/259 |
| 5,960,767 A * | 10/1999 | Akimoto | ............... | F02B 23/101 123/298 |
| 6,267,107 B1 * | 7/2001 | Ward | ............... | F02B 17/00 123/162 |
| 6,336,438 B1 * | 1/2002 | Durnholz | ............... | F02B 23/0618 123/301 |
| 6,401,702 B1 * | 6/2002 | Konig | ............... | F02B 23/00 123/193.6 |
| 7,128,047 B2 * | 10/2006 | Kuo | ............... | F02D 13/0215 123/299 |
| 7,204,225 B2 | 4/2007 | Kubo et al. | | |
| 7,689,343 B2 * | 3/2010 | Dagci | ............... | F02D 35/023 123/406.47 |
| 7,856,958 B2 | 12/2010 | Tachibana et al. | | |
| 8,469,009 B2 * | 6/2013 | Munshi | ............... | C10L 3/06 123/525 |
| 2003/0145823 A1 * | 8/2003 | Wirth | ............... | F02B 23/101 123/276 |
| 2004/0123855 A1 * | 7/2004 | Yonekawa | ............... | F02B 23/08 123/661 |
| 2005/0109328 A1 * | 5/2005 | Sakai | ............... | F02B 23/08 123/661 |
| 2005/0241612 A1 * | 11/2005 | Ward | ............... | F02B 23/08 123/301 |
| 2006/0201489 A1 * | 9/2006 | Brachert | ............... | F02B 11/02 123/568.14 |
| 2007/0068482 A1 * | 3/2007 | Yamashita | ............... | F02B 17/005 123/276 |
| 2009/0120385 A1 * | 5/2009 | Munshi | ............... | C10L 3/06 123/3 |
| 2011/0265770 A1 * | 11/2011 | Malta | ............... | F02B 23/08 123/559.1 |
| 2012/0103302 A1 * | 5/2012 | Attard | ............... | F02B 19/12 123/260 |
| 2012/0160221 A1 * | 6/2012 | Munshi | ............... | C10L 3/06 123/575 |
| 2013/0080026 A1 * | 3/2013 | Kang | ............... | F02D 13/0207 701/102 |
| 2014/0238367 A1 * | 8/2014 | Nakashima | ............... | F02B 75/12 123/657 |
| 2016/0356230 A1 * | 12/2016 | Watanabe | ............... | F02D 41/064 |
| 2017/0130657 A1 * | 5/2017 | McTaggart-Cowan | ............... | F02D 35/023 |

* cited by examiner

COMBUSTION CHAMBER GEOMETRY

FIELD OF THE INVENTION

The present application relates to combustion chamber geometry, and more particularly to combustion chamber geometry for a spark-ignited, medium duty internal combustion engine.

BACKGROUND OF THE INVENTION

An economical way to convert direct injection (DI) diesel engines to be fueled with natural gas is to replace the injector with a spark plug and modify the piston crown for natural gas operation. In this manner the modified engine can be operated with an air-fuel ratio at or near stoichiometry. The diesel engine cylinder head is flat and the combustion chamber is located almost entirely in the piston crown. In the conversion to natural gas operation the original inlet port is most often used, which combined with the combustion chamber generates a swirl motion of the intake charge. The piston crown used in the diesel engine, however, is not ideal for spark ignited operation since the geometry results in a compression ratio that is too high and the flow structure is optimized for diffusion combustion rather than for premixed flame propagation. There are generally two schools of thought on how to modify the piston crown.

The first school teaches the use of a quiescent combustion chamber geometry where a minimum amount of in-cylinder bulk flow velocity and turbulence are desired to reduce heat loss to the cylinder walls, improving efficiency. The lower amount of turbulent kinetic energy results in a slower combustion rate that reduces peak combustion pressure and temperature, thereby reducing the formation of nitrogen oxides (NOx), which is advantageous from an emissions standpoint.

The second school teaches that a very fast combustion event is desired to reduce knock. During the intake stroke, large in-cylinder bulk flow velocities are formed, which are broken up during the compression stroke into smaller scale turbulence. The resulting large turbulent kinetic energy of the intake charge improves mixing of fuel with air. In this environment the speed of the premixed flame front is significantly greater than in the quiescent combustion chamber, thereby reducing the likelihood of knock allowing greater compression ratios to be employed that more than offset the loss of heat to the cylinder walls due to the higher levels of bulk flow and turbulence. As used herein, knock is defined as the premature ignition of gaseous fuel after the ignition event and before the arrival of the advancing premixed flame front, and is typically caused by the arrival of the pressure wave from the ignition-combustion event in a localized volume in the combustion chamber, before the premixed flame front, creating the conditions necessary for ignition. The techniques taught herein are compatible with the second school.

Combustion chamber geometry plays a significant role in the transformation of large bulk flow velocities to turbulence in the combustion chamber. The geometry can enhance, or impart, a particular motion in the bulk flow during the intake stroke, and can affect the formation of turbulence in the charge during the compression stroke. In order to increase the speed of the premixed flame, a large turbulent kinetic energy is desired. It is known to use a nebula shape in the piston crown to create turbulence. The nebula shape, developed by Ricardo, uses the swirling motion generated by the inlet port to create two jets when the piston approaches top dead center (TDC) that collide with each other causing the bulk flow structure to breakdown into small scale turbulence. One such engine that uses the nebula shape in the piston crown is the ISL-G spark ignited natural gas engine currently sold by Cummins Westport Inc. in North America.

Other techniques for increasing turbulent kinetic energy include squish zones that enhance so-called squish and reverse-squish flows. U.S. Pat. No. 7,681,564 issued Mar. 23, 2010 to Umierski et al., discloses a cylinder head which has the shape of a roof complementary to the roof-shaped geometry of the piston. The piston crown has a cylindrically shaped recess or bowl. The piston also has at least two squish zones that are separated from each other by valve pockets. The valve pockets are constructed with sharp edges (preferably not rounded) that can have turbulence-generating geometries such as notches, additional projections, or similar shapes causing a disruption in the flow. Indentations extend from the piston bowl outwards towards the outer periphery of the piston, arranged next to the valve pockets, and comprise at least one edge that breaks up the bulk tumble flow, which can be constructed like the edges of the valve pocket.

Although the nebula piston crown and the '564 patent may improve combustion performance by increasing turbulent kinetic energy, combustion heat tends to concentrate in the piston crown edges associated with these designs, resulting in hot spots that remain from cycle to cycle increasing the tendency for knock and pre-ignition. As used herein, pre-ignition is the ignition of the air-fuel mixture prior to the ignition event, typically caused by hot spots in the combustion chamber. In general, knock and pre-ignition occur when the pressure and temperature conditions needed for ignition are established in a localized volume of the air-fuel mixture either prior to the ignition event (pre-ignition) or before the advancing flame front reaches the localized volume (knock). The hot spots increase the thermal load on the piston resulting in decreased durability The state of the art is lacking in techniques that increase turbulent kinetic energy in the combustion chamber while simultaneously reducing the likelihood of knock and pre-ignition. The present method and apparatus provides a combustion chamber geometry that improves turbulent kinetic energy and resistance to knock and pre-ignition.

SUMMARY OF THE INVENTION

An improved combustion chamber for a gaseous fueled internal combustion engine, in which the combustion chamber is defined by a cylinder head, a bore in a cylinder block and a piston reciprocating in the bore, comprises a piston portion of the combustion chamber defined by a recessed shape in a piston crown; and a head portion of the combustion chamber defined by a recessed surface in the cylinder head. A ratio between the piston portion of combustion chamber volume and the head portion of combustion chamber volume is in a range of 0.7 to 1.3. In a preferred embodiment, the ratio is in a range of 0.765 to 0.945.

In another preferred embodiment, the head portion of the combustion chamber is shaped as a rectangular hip roof. Preferably, the rectangular hip roof can comprise hip ends each having a curved concave contour, and sloping faces that form an angle with a plane perpendicular to a longitudinal cylinder axis between a range of 8° and 12°. The recessed shape in the piston crown can be a bowl having a curved concave contour. There can be an ignition device, such as by way of example a spark plug or laser device, centrally located in the combustion chamber. The combustion chamber cooperates with an air intake passage to form a tumble flow of an intake charge. During the compression stroke associated with the internal combustion engine, the bulk tumble flow transforms into turbulence around the ignition device, improving flame initiation during ignition events.

In a preferred embodiment, the combustion chamber is employed in medium duty engine applications. A bore to stroke ratio between a diameter of the cylinder bore and a stroke of the piston can be in a range of 0.75 and 0.95. The piston portion of combustion chamber volume can be in a range of 40 cc to 53 cc, and the head portion of combustion chamber volume can be in a range of 53 cc to 56 cc. A compression ratio can be in a range of 11 to 1 (11:1) and 15 to 1 (15:1). The gaseous fueled internal combustion engine can operate at a stoichiometric air-fuel ratio, and can be modified from a Diesel internal combustion engine.

There is provided an improved combustion chamber for a spark ignited, gaseous fueled internal combustion engine. The combustion chamber is defined by a cylinder head, a bore in a cylinder block and a piston reciprocating in the bore, and is fluidly communicating with an air intake passage and an exhaust passage. The combustion chamber comprises a concave bowl in a crown of the piston; and a rectangular hip roof in the cylinder head. The combustion chamber cooperates with an air intake passage to form a tumble flow in the combustion chamber. A compression ratio is in a range of 11 to 1 (11:1) and 15 to 1 (15:1). A ratio between a first portion of combustion chamber volume in the piston and a second portion of the combustion chamber volume in the cylinder head is in a range of 0.7 to 1.3. The rectangular hip roof can comprise hip ends each having a curved concave contour and the concave bowl can be spherical.

DETAILED DESCRIPTION OF PREFERRED EMBODIMENT(S)

Figure 1:
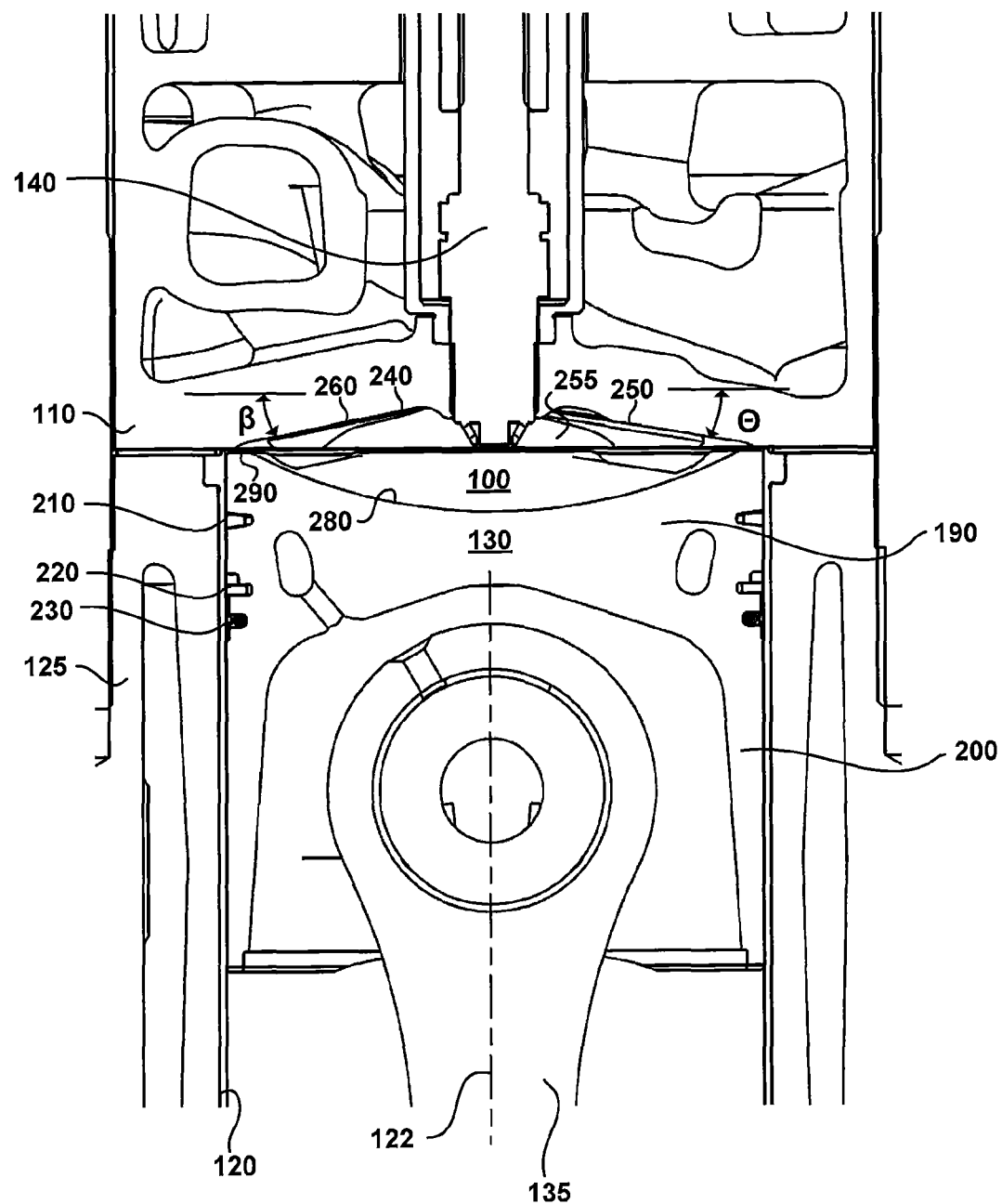
FIG. 1 is a cross-sectional view of a combustion chamber, taken along a plane that includes the central longitudinal cylinder axis, illustrating a piston in a top dead center position and an ignition device according to an embodiment.
Figure 2:
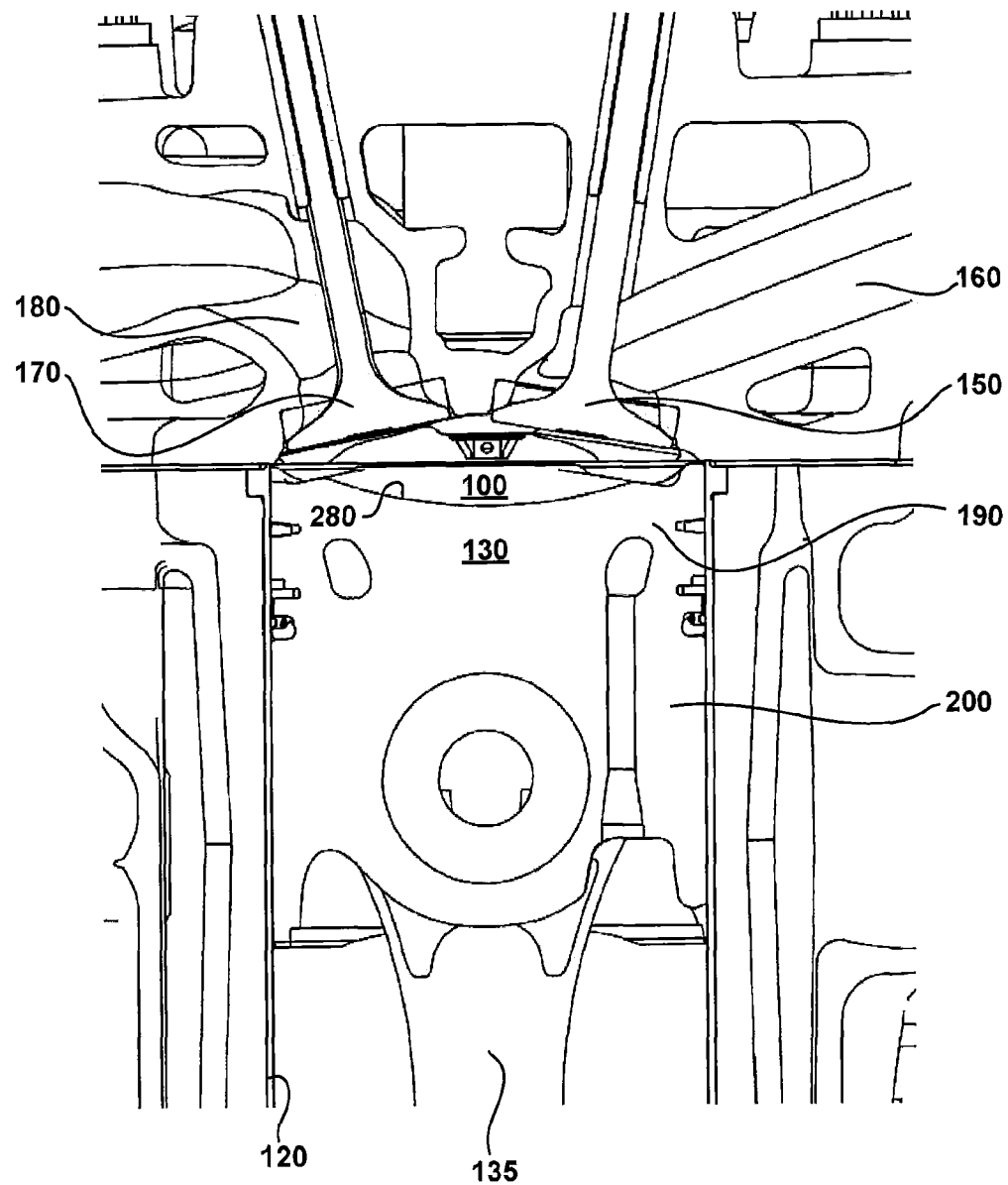
FIG. 2 is a cross-sectional view of the combustion chamber of FIG. 1, taken along another plane, illustrating intake and exhaust passageways.
Figure 3:
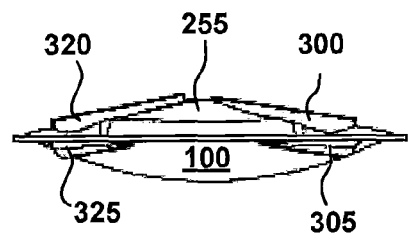
FIG. 3 is a cross-sectional outline view of the combustion chamber of FIG. 1.
Figure 4:
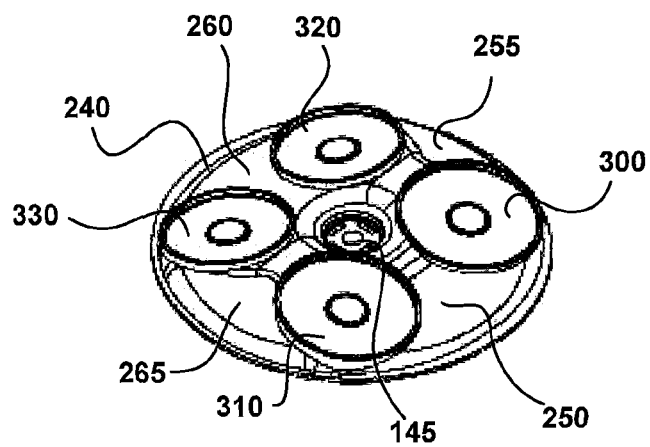
FIG. 4 is an isometric view of a roof surface of the combustion chamber of FIG. 1, viewed from above the combustion chamber as if the cylinder head were transparent.

Referring to the figures, there is shown combustion chamber 100 defined by cylinder head 110, cylinder bore 120 in cylinder block 125, and piston 130. Combustion chamber 100 is designed for a gaseous fueled internal combustion engine, and particularly for an engine operating at or near a stoichiometric air-fuel ratio. Piston 130 is connected with a crank (not shown) by connecting rod 135 and is made to reciprocate within cylinder bore 120. As is known by those skilled in the technology cylinder bore 120 can comprise a liner material. In the illustrated embodiment ignition device 140 is configured in cylinder head 110 to protrude centrally into combustion chamber 100. The ignition device is a positive ignition source such as by way of example a spark plug or laser device. Intake valve 150 selectively allows fluid communication between intake passage 160 and combustion chamber 100 during at least an intake stroke of piston 130, and exhaust valve 170 selectively allows fluid communication between combustion chamber 100 and exhaust passage 180 during at least an exhaust stroke. Although only one intake valve and one exhaust valve are illustrated in FIGS. 1 and 2, there can be more than one intake and exhaust valve respectively. For example, the arrangement shown in FIG. 4 is for a cylinder head that accommodates four valves per cylinder, typically two intake valves and two exhaust valves. Intake passage 160 and combustion chamber 100 cooperate to create a tumble flow of the intake charge in the combustion chamber during the intake stroke. In the illustrated embodiment gaseous fuel is introduced upstream of intake valve 150, and the intake charge comprises at least air and gaseous fuel, and can further comprise recirculated exhaust gases. In other embodiments gaseous fuel can be directly introduced into the combustion chamber.

Piston 130 is divided between piston crown 190 (the top part of the piston) and piston skirt 200 (the bottom part of the piston draping over connecting rod 135). The piston crown has the mechanical strength to withstand the forces of combustion, and is made of materials capable of withstanding the heat of combustion. Preferably the thermal expansion coefficient of the material making up piston 130 is small so the tolerances between the piston and cylinder bore 120 are correspondingly small. Regardless of the tolerances between the cylinder bore and the piston, in order for the piston to reciprocate there must be a limited gap therebetween. To prevent combustion gases from entering the crankcase (not shown) and to maintain combustion pressure within combustion chamber 100, piston rings are employed as a seal between piston 130 and cylinder bore 120. In the illustrated embodiment there are three annular piston rings 210, 220 and 230. Piston ring 210 is a top compression ring and of the three rings, it is the primary seal between the piston and the cylinder bore, taking the most abuse from combustion. Piston ring 220 is a second compression ring and acts as a secondary seal between the piston and the cylinder bore. In this example the ring furthest removed from the combustion chamber, piston ring 230, is an oil control ring and operates to scrape excess oil off the wall of cylinder bore 120 to help maintain lubrication and oil consumption. As would be known to those familiar with the technology the piston rings can each serve multiple purposes. In other embodiments other arrangements of piston rings can be employed.

Figure 5:
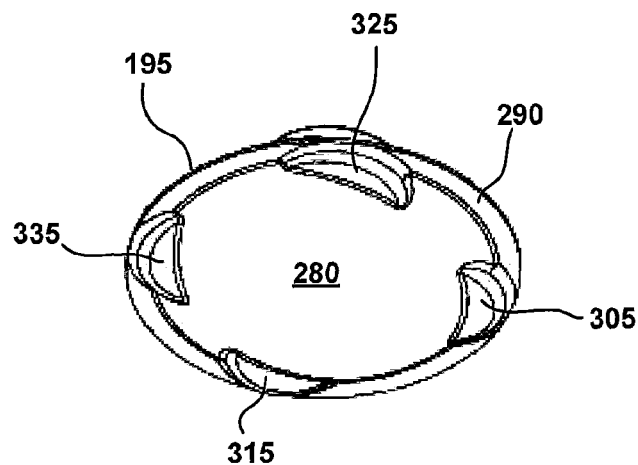
FIG. 5 is an isometric view of a piston top land of the combustion chamber of FIG. 1 viewed from within the combustion chamber.

The geometry of combustion chamber 100 is now described in more detail. Referring to the figures and first to FIG. 4, the recessed surface, or contour, of roof 240 in cylinder head 110 above cylinder bore 120 (seen in FIG. 1) resembles a modified rectangular hip roof. Faces 250 and 260 correspond to the trapezoidal faces of a rectangular hip roof, and faces 255 and 265 correspond to the triangular faces that are also known as the hip ends. Faces 250 and 260 are gently sloping with angles $\theta$ and $\beta$ respectively to the plane perpendicular to longitudinal cylinder axis 122 between a range of 8° and 12°, which is best seen in FIG. 1. In a preferred embodiment $\theta$ is 9° and $\beta$ is 11°. Referring back to FIG. 4, face 250 comprises intake valve pockets 300 and 310 and face 260 comprises exhaust valve pockets 320 and 330. Faces 255 and 265 each have a concave cavity facing combustion chamber 100, which in a preferred embodiment has a spherical contour. Valve pockets 300 and 320 extend partially into face 255 and valve pockets 310 and 330 extend partially into face 265 in the illustrated embodiment, which is determined by the size of bore 120 (seen in FIG. 1) and the size of the valve pockets. However, it is not a requirement that the valve pockets extend into faces 255 and 265 in other embodiments. Faces 250, 255, 260 and 265 extend towards the outer periphery of cylinder bore 120, best seen in FIGS. 1 and 4. Piston crown 190 comprises a recessed shape in the form of bowl 280 and annular squish band 290 around the bowl. In the illustrated embodiment shown in greater detail in FIG. 5, bowl 280 comprises a concave cavity having a spherical contour. Piston top land 195 is the outer part of piston crown 190 facing cylinder head 110, comprising bowl 280 and squish band 290. The piston top land 195 includes valve recesses 305, 315, 325 and 335 (corresponding to valve pockets 300, 310, 320 and 330 respectively) for spatial clearance to allow opening of intake and exhaust valves 150 and 170 respectively. Squish band 290 preserves the mechanical integrity of the piston crown outer edge with valve recesses 305, 315, 325 and 335, in addition to performing a squishing function as would be known to those skilled in the technology. In the illustrated embodiment, roof 240 (shown in FIG. 1 and in greater detail in FIG. 4) comprises centrally located bore 145 for ignition device 140, however in other embodiments the bore can be offset with respect to the cylinder axis.

The volume of combustion chamber 100 is divided generally between a piston portion in piston 130, a head portion in cylinder head 110 and a top land portion in the piston top land region. The top land portion comprises clearance volumes from features in the piston top land 195 such as valve recesses 305, 315, 325 and 335, and is relatively small compared to the piston and head portions. For clarity the piston portion volume is referred to herein as the piston volume and the head portion volume is referred to as the cylinder head volume. When a ratio between the piston volume and the cylinder head volume is within a range of 0.7 to 1.3, and more preferably a range between 0.765 and 0.945, the tumble flow (bulk flow) of the intake charge is efficiently converted into turbulence during the compression stroke without the need for flow splitting features (edges, notches, projections) in the combustion chamber to generate turbulence. The tumble flow of the intake charge is compressed as piston 130 travels towards TDC, creating a centrally located region of high turbulent kinetic energy under ignition device 140 as the layers of the bulk flow begin to interact with each other. This enhances flame initiation during the ignition event. Without these additional flow splitting features, a surface area-to-volume ratio of combustion chamber 100 is reduced, which correspondingly reduces heat transfer to combustion chamber walls thereby retaining more heat in the working gas for improved efficiency. The sharing of the combustion chamber volume between the piston volume and the cylinder head volume simplifies the piston crown geometry, enabling the smooth and gently transitioning spherical contour of bowl 280, thereby distributing mechanical and thermal stresses more evenly over the piston top land 195. There are a number of advantages associated with the relatively smooth and gently transitioning piston crown top. Heat is distributed more evenly across the top of piston crown 190, reducing the requirement for an in-piston cooling gallery. The mechanical strength of piston crown 190 is increased, with less stress raisers from the spherical contour of bowl 280. There are fewer edges compared to piston designs that comprise nebula, cylindrical, or square shaped recesses, reducing the occurrence and intensity of hotspots thereby improving knock and pre-ignition resistance, and allowing a larger compression ratio to be employed, improving the volumetric efficiency of the engine for increased levels of torque and power for a given fuel consumption rate. There is a reduction in the number and size of crevice volumes where unburnt or partially burnt fuel can reside, which can result in reduced unburned hydrocarbon emissions.

Combustion chamber 100 is particularly suitable for a medium duty engine. In the context of this disclosure, the diameter of cylinder bore 120 is defined to be within a range of 90 mm and 120 mm for a medium duty engine. In alternative embodiments, the diameter of cylinder bore 120 can be greater than 120 mm, such as for heavy duty engines and even larger engines such as those used in locomotive, mine haul and marine applications. In preferred embodiments it has been determined that a ratio between the diameter of cylinder bore 120 and the length of strokes of piston 130 (bore to stroke ratio) within a range of 0.75 and 0.95 provides a surprising increase in power density while not sacrificing efficiency. Efficiency is increased by reducing heat transfer from combustion gases to cylinder bore 120 thereby increasing the energy transfer to a crankshaft of the engine. The volume swept by each piston 130 in respective cylinder bores 120 is within a range of 0.8 liters and 2.5 liters. Different from light duty engines that use tumble motion, the maximum engine speed of the medium duty engine is 2700 revolutions per minute (rpm) in all operating modes. In a preferred embodiment the cylinder head volume is around 54.55 cubic centimeters (cc), and the piston bowl volume can range from 41.7 cc to 51.5 cc depending on the compression ratio employed. The compression ratio of the medium duty engine employing combustion chamber 100 can be in a range between 11 to 1 (11:1) and 15 to 1 (15:1). The top end of the compression ratio range is beyond the capability of previous gaseous fueled engines (that were converted from a diesel engine), which typically had a compression ratio of at most 12 to 1 (12:1).

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A combustion chamber of a gaseous fueled internal combustion engine, the combustion chamber defined by a cylinder head, a bore in a cylinder block and a piston reciprocating in the bore, the combustion chamber comprising:
   a piston portion of the combustion chamber of said gaseous fueled internal combustion engine defined by a recessed shape in a piston crown;
   a head portion of the combustion chamber of said gaseous fueled internal combustion engine defined by a recessed surface in the cylinder head; and
   a positive ignition device for igniting a gaseous fuel;
   wherein the gaseous fueled internal combustion engine operates at a stoichiometric air-fuel ratio and a ratio between the piston portion of combustion chamber volume and the head portion of combustion chamber volume is in a range of 0.7 to 1.3; and wherein the recessed shape in said piston crown is bounded by a piston top land, and an annular upper surface of said piston top land cooperatively faces an annular outer periphery of said head portion along a plane substantially perpendicular to said longitudinal cylinder axis at top dead center whereby said piston portion remains substantially below said plane at top dead center and said head portion remains substantially above said plane at top dead center.

2. The combustion chamber of claim 1, wherein the head portion of the combustion chamber is shaped as a hip roof.

3. The combustion chamber of claim 2, wherein the hip roof is rectangular and comprises hip ends each having a curved concave contour.

4. The combustion chamber of claim 2, wherein the hip roof comprises sloping faces that form an angle with a plane perpendicular to a longitudinal cylinder axis between a range of 8° and 12°.

5. The combustion chamber of claim 1, wherein the recessed shape in the piston crown is a bowl having a curved concave contour.

6. The combustion chamber of claim 1, wherein the ratio is in a range of 0.765 to 0.945.

7. The combustion chamber of claim 1, wherein the positive ignition device is centrally located in the combustion chamber.

8. The combustion chamber of claim 1, wherein the combustion chamber cooperates with an air intake passage to form a tumble flow of an intake charge.

9. The combustion chamber of claim 1, wherein a bore to stroke ratio between a diameter of the cylinder bore and a stroke of the piston is in a range of 0.75 and 0.95.

10. The combustion chamber of claim 1, wherein the piston portion of combustion chamber volume is in a range of 40 cc to 53 cc.

11. The combustion chamber of claim 1, wherein the head portion of combustion chamber volume is in a range of 53 cc to 56 cc.

12. The combustion chamber of claim 1, wherein a compression ratio is in a range of 11 to 1 (11:1) and 15 to 1 (15:1).

13. The combustion chamber of claim 1, wherein the internal combustion engine is modified from a Diesel internal combustion engine.

14. A combustion chamber of a spark ignited, gaseous fueled internal combustion engine, the combustion chamber defined by a cylinder head, a bore in a cylinder block and a piston reciprocating in the bore, the combustion chamber fluidly communicating with an air intake passage and an exhaust passage, the combustion chamber comprising:
a concave bowl in a crown of the piston;
a rectangular hip roof in the cylinder head; and
a positive ignition device for igniting a gaseous fuel;
wherein the combustion chamber of said gaseous fueled internal combustion engine cooperates with the air intake passage to form a tumble flow in the combustion chamber;
wherein a compression ratio is in a range of 11 to 1 (11:1) and 15 to 1 (15:1); a ratio between a first portion of combustion chamber volume in the piston and a second portion of the combustion chamber volume in the cylinder head is in a range of 0.7 to 1.3; and wherein the concave bowl in said piston crown is bounded by a piston top land, and an annular upper surface of said piston top land cooperatively faces an annular outer periphery of said head portion along a plane substantially perpendicular to said longitudinal cylinder axis at top dead center whereby said piston portion remains substantially below said plane at top dead center and said head portion remains substantially above said plane at top dead center.

15. The combustion chamber of claim 14, wherein the rectangular hip roof comprises hip ends having a curved concave contour.

16. The combustion chamber of claim 14, wherein the concave bowl is spherical.

17. A combustion chamber of a gaseous fueled internal combustion engine, the combustion chamber defined by a cylinder head, a bore in a cylinder block and a piston reciprocating in the bore, the combustion chamber comprising:
a piston portion of the combustion chamber of said gaseous fueled internal combustion engine defined by a recessed shape in a piston crown; and
a head portion of the combustion chamber of said gaseous fueled internal combustion engine defined by a recessed surface in the cylinder head shaped as a hip roof having sloping faces that form an angle with a plane perpendicular to a longitudinal cylinder axis between a range of 8° and 12°;
wherein a ratio between the piston portion of combustion chamber volume and the head portion of combustion chamber volume is in a range of 0.7 to 1.3; and
wherein the recessed shape in said piston crown is bounded by a piston top land, and an annular upper surface of said piston top land cooperatively faces an annular outer periphery of said head portion along a plane substantially perpendicular to said longitudinal cylinder axis at top dead center whereby said piston portion remains substantially below said plane at top dead center and said head portion remains substantially above said plane at top dead center.

18. The combustion chamber of claim 17, wherein a combustion chamber facing surface of an intake or exhaust valve is parallel to one of the sloping faces such that the combustion chamber facing surface of the intake or the exhaust valve forms an angle with the plane perpendicular to the longitudinal cylinder axis between a range of 8° and 12°.

19. The combustion chamber of claim 17, wherein the combustion chamber cooperates with an air intake passage to form a tumble flow of an intake charge.

20. The combustion chamber of claim 17, wherein the piston portion of combustion chamber volume is in a range of 40 cc to 53 cc.

21. The combustion chamber of claim 17, wherein the head portion of combustion chamber volume is in a range of 53 cc to 56 cc.

22. The combustion chamber of claim 17, wherein a compression ratio is in a range of 11 to 1 (11:1) and 15 to 1 (15:1).

* * * * *